Feb. 23, 1965 E. A. GERBER 3,171,048
CRYSTAL FREQUENCY TEMPERATURE COMPENSATION
Filed June 7, 1963
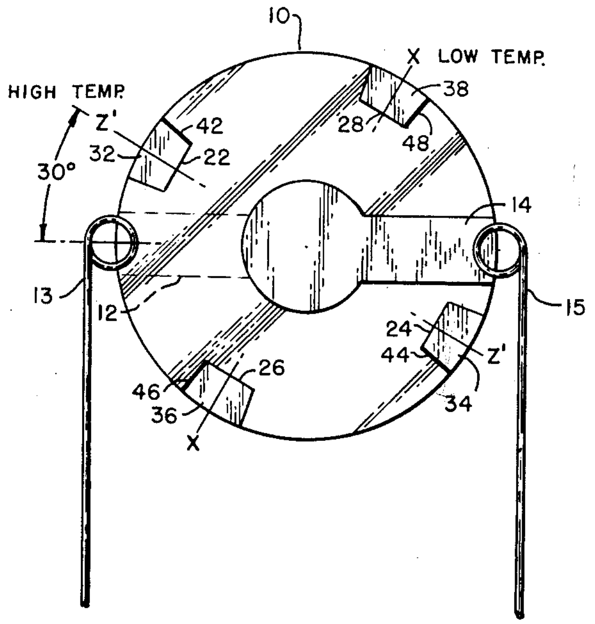
INVENTOR,
EDUARD A. GERBER.
BY Edward J. Kelly, Herbert Berl &
Julian C. Keppler
ATTORNEYS

3,171,048
CRYSTAL FREQUENCY TEMPERATURE COMPENSATION

Eduard A. Gerber, West Long Branch, N.J., assignor to the United States of America as represented by the Secretary of the Army Filed June 7, 1963, Ser. No. 286,433
5 Claims. (Cl. 310—8.9)
(Granted under Title 35, U.S. Code (1952), sec. 266)

The invention described herein may be manufactured and used by or for the Government for governmental purposes, without the payment of any royalty thereon.

This invention relates to crystal temperature compensation and particularly to the use of temperature sensitive elements, in conjunction with a crystal, to compensate for its frequency variation with respect to temperature.

There are several methods for maintaining a relatively constant resonant frequency in a crystal. The most common method is to cut the crystal along one of the crystalographic axes that provides the minimum frequency-temperature variation over a maximum range. However, this maximum range may not be enough, and both above and below this range of temperatures, the frequency changes rapidly with temperature.

One means for compensating for the variation of the frequency of such a crystal cut—for example, an AT cut—beyond its relatively constant range, is taught in my patent on "Crystal Frequency Stabilization," No. 3,020,423, granted February 6, 1962. In this patent, the variation in the frequency of the crystal beyond the relatively linear range is compensated by applying pressure, proportional to the temperature change, across the axis of the crystal that produces a change in frequency with respect to pressure opposite to the change in the frequency of the crystal with respect to temperature.

While this system is relatively simple and highly effective, it does take up an appreciable amount of room outside of that required for the actual crystal; it adds more weight to the crystal assembly; and it has many parts that require precise machining, critical assembly, and careful adjustment. In addition, since it is external to the crystal and of considerable bulk, it is inherently vulnerable to mechanical shock or displacement resulting in temporary or permanent frequency errors.

It is therefore an object of this invention to provide a temperature compensating device for a piezoelectric crystal that is a minimum in size and weight; that has the minimum number of critical parts and adjustments; and that provides the simplest possible construction, installation, and alignment.

These and other objects are accomplished by cutting slots within the body of the crystal and mounting slugs within the slots. The slugs must have a higher coefficient of expansion than the crystal to provide compensation for the higher temperature, or must have a lower coefficient of expansion than the crystal to provide compensation for the lower temperature frequency variations.

In the case of the higher temperature compensation, the slot must be situated and the slug positioned to apply pressure against the walls of the slot in the direction necessary to provide an equal and opposite change in the frequency of the crystal with respect to pressure, as that caused by the increase in temperature. The slug must be adjusted to engage the opposing walls of the slot and begin its application of pressure at the temperature whereat the frequency of the crystal begins to go beyond the limits of the acceptable range.

In the case of the lower temperature compensation, the slot and the slug must be positioned to apply pressure against the walls of the slot in the direction necessary to provide a change in the frequency of the crystal with respect to pressure opposite to the change in the frequency of the crystal with respect to the decreased temperature, and, again, the slug must be adjusted to engage the walls of the slot at the temperature whereat the frequency of the crystal begins to go beyond the limits of the acceptable range.

This invention will be better understood and further objects of this invention will become apparent from the following specification, and the drawing which illustrates a preferred embodiment of this invention.

Referring now to the drawing, an AT cut crystal 10 has the usual electrodes 12 and 14 and the conductors 13 and 15 to connect the crystal into any of the many, well-known circuits that require crystals. Under certain conditions these electrodes and conductors can also take the place of mechanical supports.

The crystal 10 includes a first pair of slots 22 and 24, on opposite sides of the crystal, along the Z' axis, and a second pair of slots 26 and 28, on opposite sides of the crystal, in quadrature with the slots 22 and 24, along the X axis.

Slugs 32 and 34 are positioned in the slots 22 and 24 respectively, and slugs 36 and 38 are positioned in the slots 26 and 28 respectively.

In the preferred embodiment of this invention, each of the slugs is cemented to one of the sides of the corresponding slot. The other sides 42, 44, 46, and 48 of the slots are not attached to the corresponding slugs and, when the crystal is in a normal range of the AT cut compensation there is a gap at each of the locations 42–48.

In operation, the slugs 32 and 34 have a higher coefficient of expansion than that along the X axis of the crystal, and the slugs 36 and 38 have a lower coefficient of expansion than that along the Z axis of the crystal. When the ambient temperature of the crystal assembly is within the normal range of the AT cut compensation, mentioned earlier, no additional compensation is necessary, and none of the slugs is in contact with both sides of its slot simultaneously. However, as the ambient temperature of the crystal assembly rises above the limit of the normal range and the resonant frequency starts to drift above the acceptable amount, the higher rate of expansion of the slugs 32 and 34 with respect to the crystal closes the gaps 42 and 44 until the slugs 32 and 34 are in contact with both sides of the corresponding slots 22 and 24 simultaneously. As the temperature increases further, the pressure against the sides of both slots increases, and this pressure, in turn, causes a change in the frequency of the crystal. The size and shape of the slugs 32 and 34, and their coefficient of expansion relative to that of the X axis of the crystal, are so chosen that the change in frequency of the crystal due to the increased pressure is equal and opposite to the change in frequency of the crystal due to increased temperature for the same change in temperature.

During the increase in temperature, the slugs 36 and 38, which expand less than the crystal, draw away from the unattached walls of the slots 26 and 28, and the corresponding gaps 46 and 48 increase. However, as the temperature decreases, the lesser coefficient of expansion of the slugs 36 and 38 with respect to the crystal causes the gaps 46 and 48 to decrease, and when the ambient temperature of the crystal assembly drops below the limit of the normal range, mentioned earlier, and reaches the temperature level whereat the resonant frequency of the crystal starts to go below the acceptable amount, the sides of both of the slots come in contact with the slugs 36 and 38 and pressure is exerted—against the sides of the slots—which increases as the temperature decreases.

Again, the size and shape of the slugs, and their coefficient of expansion with respect to that of the Z′ axis of the crystal are so chosen that the change in frequency of the crystal due to the increased pressure exerted by the slugs 36 and 38 is equal and opposite to the change in frequency of the crystal, due to the decrease in temperature, for the same change in temperature.

It is self-apparent that the relative coefficients of expansion of the crystal and the slugs 32 and 34 cause the gaps 42 and 44 to increase during the above decrease in temperature.

While the pairs of slots shown here are effective in the X and Z′ axes, where the degree of the correction is greatest for this type of crystal, the effect is also useable, and the slots may be positioned, in other axes of this AT cut and in other of the many different types of crystal cuts that are possible.

The shapes of the slots and their positions along the periphery of the crystal in the drawing are chosen as being the most convenient to cut or grind with the required precision. However, other shapes and positions of the slots or holes in the crystal are also possible, wherein a force can be exerted between opposing surfaces or edges of the crystal by a temperature controlled, compressive element, along a given axis of a crystal.

The size and the shape of the slugs can also be of almost infinite variety, except that they must conform to the slot or hole in which they are to function, and they must be of suitable coefficient of expansion, have enough physical strength, and be operable over a wide enough range of temperatures to accommodate the characteristics of the desired crystal and accomplish the required results. With an AT cut quartz crystal, for example, the slugs 32 and 34 may be of aluminum which has a higher coefficient of expansion than that of the crystal along its X axis, and the slugs 36 and 38 may be of fuzed quartz which has a lower coefficient of expansion than that of the crystal along its Z′ axis.

The slugs are not limited to single pieces of metal, since it is obvious that other methods of applying a mechanical force, corresponding to a change in temperature, that can be fitted into the appropriate slots or holes cut into a crystal for this purpose, are within the scope of this invention. The well known bimetallic elements, bent to conform to the sides of the slots, would be quite suitable, and, by reversing the direction of bend, the same type of bimetal could be uesd for compensation in both the increasing as well as the decreasing temperature compensating slots.

The non-linear characteristics of the crystal frequency temperature variation can also be compensated for by using non-linear force producing elements actuated by temperature. For example, additional slugs of the same or differing coefficients of expansion can be fitted into the same or additional slots to engage their opposing sides at differing temperatures.

What is claimed is:

1. A crystal frequency temperature compensating device comprising a quartz crystal having two parallel plane faces and a substantially circular edge; at least one slug, having opposing sides perpendicular to said faces, inset within said crystal; and opposing surfaces within said crystal, perpendicular to said faces and to a given axis of said crystal, oriented to engage said opposing sides of said slug; said slug having a coefficient of expansion other than that along said given axis of said crystal, whereby a given change in temperature of said crystal and said slug applies sufficient pressure between said opposing surfaces within said crystal to change the frequency of said crystal by an amount equal and opposite to the change in the frequency of said crystal due to said given change in temperature.

2. A frequency compensating device to improve the temperature stability of a crystal comprising an AT cut crystal having parallel faces and a peripheral edge; said peripheral edge indented to form slots having opposing sides substantially perpendicular to a given axis of said crystal; slugs, having opposing ends positioned to engage the opposing sides of said slots, positioned within each of said slots; said slugs having different coefficients of expansion than that along said given axis of said crystal; whereby said ends of said slugs apply increasing pressure between said opposing sides of said slots as the temperature change, to produce a change in frequency of the crystal to compensate for the change in the frequency of the crystal due to the change in temperature.

3. A frequency compensating device as in claim 2 having a first pair of said slots, one at each end of the Z′ axis of said crystal, with the opposing sides of said first pair of slots substantially perpendicular to the X axis of said crystal; and a second pair of slots, one at each end of said X axis of said crystal, with the opposing sides of said second pair of slots substantially perpendicular to said Z′ axis of said crystal.

4. A frequency compensating device as in claim 3 having a first pair of said slugs having a coefficient of expansion greater than that along said X axis of said crystal; and a second pair of said slugs, having a coefficient of expansion less than that along said Z′ axis of said crystal.

5. A frequency compensating device as in claim 4 wherein one of said opposing ends of each of said slugs is fastened to one of said opposing sides of each of said slots; the other of said opposing ends of each of said first pair of slugs engages the other of said opposing sides of the corresponding one of said slots at the temperature whereat the frequency of said crystal rises to the upper limit of the normal frequency range of said crystal; and the other of said opposing ends of each of said second pair of slugs engages the other of said opposing sides of the corresponding one of said slots at the temperature whereat the frequency of said crystal falls to the lower limit of the normal frequency range of said crystal.

References Cited by the Examiner

UNITED STATES PATENTS

| | | | |
|---|---|---|---|
| 2,509,478 | 5/50 | Caroselli | 310—8.9 |
| 3,020,423 | 2/62 | Gerber | 310—8.9 |
| 3,102,963 | 9/63 | Gerber | 310—8.9 |

MILTON O. HIRSHFIELD, *Primary Examiner.*